United States Patent
Qian

(10) Patent No.: US 9,814,120 B2
(45) Date of Patent: Nov. 7, 2017

(54) CHANNEL ALLOCATION METHOD AND APPARATUS FOR USE IN A WIRELESS COMMUNICATION LOCAL AREA NETWORK

(75) Inventor: Xuecheng Qian, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 366 days.

(21) Appl. No.: 12/809,083

(22) PCT Filed: Dec. 26, 2008

(86) PCT No.: PCT/IB2008/055543
§ 371 (c)(1),
(2), (4) Date: Aug. 25, 2010

(87) PCT Pub. No.: WO2009/083924
PCT Pub. Date: Jul. 9, 2009

(65) Prior Publication Data
US 2011/0028176 A1     Feb. 3, 2011

(30) Foreign Application Priority Data

Dec. 29, 2007   (CN) .......................... 2007 1 0308134

(51) Int. Cl.
*H04B 7/00*     (2006.01)
*H05B 37/02*    (2006.01)
(Continued)

(52) U.S. Cl.
CPC ......... *H05B 37/0272* (2013.01); *H04W 72/04* (2013.01); *H04W 84/12* (2013.01)

(58) Field of Classification Search
None
See application file for complete search history.

(56) References Cited

U.S. PATENT DOCUMENTS

| 5,081,623 | A | 1/1992 | Ainscow |
| 6,278,718 | B1 * | 8/2001 | Eschholz .................. 370/503 |

(Continued)

FOREIGN PATENT DOCUMENTS

| DE | 202006007896 U | 7/2006 |
| EP | 0752632 A2 | 6/1997 |
| WO | WO0213490 A | 2/2002 |

OTHER PUBLICATIONS

"Contention Control in Multi-Access Resource Systems" Gertrude Levine , Classification of Channel Allocation Protocol.

*Primary Examiner* — Ankur Jain
(74) *Attorney, Agent, or Firm* — Meenakshy Chakravorty

(57) ABSTRACT

A method and apparatus for allocating channels for a wireless communication local area network are presented. A system includes a console and a plurality of nodes controllable by the console through wireless communication. At least two nodes are connected in series, each of the nodes being configured to transmit signals in turn. A trigger signal is sent to a first node, and a first response signal sent by the first node in response to the trigger signal to determine that the first node is available. A first wireless channel is allocated for wireless communication between the console and the first node, and for sending information including the allocation of the first wireless channel to the first node, whereupon the first node transmits the trigger signal to a second node adjacent to the first node after confirming that the allocation of the first wireless channel has been completed.

14 Claims, 4 Drawing Sheets

(51) Int. Cl.
*H04W 72/04* (2009.01)
*H04W 84/12* (2009.01)

(56) References Cited

U.S. PATENT DOCUMENTS

| | | |
|---|---|---|
| 6,680,586 B1 | 1/2004 | Chen |
| 6,717,515 B1 * | 4/2004 | Osako et al. ............... 340/540 |
| 2004/0164689 A1 | 8/2004 | Knight |
| 2005/0143009 A1 * | 6/2005 | Nielsen et al. ............ 455/67.11 |
| 2007/0210981 A1 * | 9/2007 | Chung et al. ............... 345/1.1 |
| 2008/0240026 A1 * | 10/2008 | Shih et al. ................. 370/329 |

\* cited by examiner

CHANNEL ALLOCATION METHOD AND APPARATUS FOR USE IN A WIRELESS COMMUNICATION LOCAL AREA NETWORK

TECHNICAL FIELD

The present invention relates to a channel allocation method and apparatus for use in a Wireless communication local area network, in particular to a channel allocation method and apparatus for use in a wireless communication local area network used for illumination control.

BACKGROUND ART

Wireless communication local area networks have been increasingly widely used in recent years, especially combined with techniques in other fields in order to develop wireless control local area networks that meet different demands, bringing people great convenience. At the same time, however, these networks bring with them various requirements and problems.

For example, lighting systems controlled by wireless communication techniques have seen a major development in recent years. These lighting networks are usually centrally controlled, allowing a user to achieve various kinds of integral effects in real time by controlling respective nodes. An important feature of such a lighting network is that the data transmission rates between a console and respective nodes are asymmetrical, usually there are only one or very few consoles but a large number of nodes.

The conventional technique is to connect a console and the plurality of nodes by cables to form a network, but this causes many difficulties in installing, debugging, and maintenance of the network. Nowadays, wireless communication is used to replace cable connection, thus avoiding the problems caused by the use of cables.

In such a remotely controlled lighting network, one of the key factors is that the console needs to allocate a specific channel to each of the nodes in the lighting network, so that each node can communicate with the console via said specific channel for displaying and updating a specific content in real time. Another key factor is that the specific content communicated between each node and the console should correspond to the physical location of respective node, so that the nodes can cooperate with each other to achieve an integral display effect.

Where connections between the nodes and the console are realized by cables, the specific network addresses (channels) can be easily allocated through the physical connection relationships of the nodes, so the above requirements can be easily met. In a wireless communication system, however, the respective nodes are mutually independent, and the console cannot automatically determine the physical locations of the respective nodes, so the correspondence between a specific channel and the physical location of a node cannot be automatically obtained, which is an inconvenience in the use of the wireless communication technique.

With respect to the above-mentioned problem, the present way of establishing correspondence between a channel of a node and the physical address of the node is, in general, to manually record the physical locations of the respective nodes and then allocate a specific channel to each of the nodes. In a lighting network with wireless control, this is the usual method of enabling the console to control the nodes accurately and to achieve the integral display effect set by the console. However, this method involves a great workload, a complicated execution process, a long execution time, and a high error rate. Especially if the number of nodes is very large, it will become very difficult to allocate a respective channel to each node in this way.

The above problem is typical in remotely controlled lighting networks. In fact, the same problem exists in other fields of control through wireless communication. In a remotely controlled inductor network, for example, the physical location of a node corresponding to an inductor is also manually recorded at present, and a specific channel is allocated thereto based on said record so as to link the specific channel of each node to the physical location thereof. If there is a large number of inductors present, the above-mentioned difficulties are inevitable.

SUMMARY OF THE INVENTION

An object of the present invention is to provide a convenient allocation of channels for a wireless communication local area network in accordance with the physical addresses of the nodes.

To achieve said object, the present invention proposes that in a wireless local area network, wherein the nodes are controlled by a console, the nodes are first connected in series, then a trigger signal is sent to trigger the nodes in turn, and a wireless channel is allocated to each of the nodes so as to enable a wireless communication with the console. Since the nodes are connected in a linear order and are triggered in the same order, the physical locations of the triggered nodes are known or can be easily ascertained. Accordingly, the correspondence between a wireless channel and the physical location of a respective node can be readily established. Therefore, the console can conveniently perform a remote control of the respective nodes in accordance with the physical locations thereof.

According to one aspect, the present invention provides a method of allocating channels for a wireless communication local area network, the system comprises a console and a plurality of nodes that can be controlled by the console through wireless communication; and said method comprises the steps of connecting at least two nodes in series via a connecting means, each of the nodes being configured to transmit signals in turn through said connecting means;

sending a trigger signal to a first node through said connecting means;

receiving a first response signal sent by the first node in response to said trigger signal so as to determine that the first node is available;

allocating a first wireless channel for wireless communication between the console and the first node and sending information including the allocation of the first wireless channel to the first node; whereupon the first node transmits the trigger signal to a second node adjacent to the first node after confirming that the allocation of the first wireless channel has been completed.

According to another aspect, the present invention provides a method of allocating channels for a wireless communication local area network, the system comprises a console and a plurality of nodes that can be controlled by the console through wireless communication; and said method comprises the steps of connecting at least two nodes in series via a connecting means, each of the nodes being configured to transmit signals in turn through said connecting means;

receiving, by a first node, of a trigger signal through said connecting means;

sending a first response signal by the first node in response to said trigger signal so as to confirm that the first node is available;

receiving a channel allocating signal, said channel being used for wireless communication between the console and the first node;

transmitting the trigger signal to a second node adjacent to the first node.

According to another aspect, the present invention provides an apparatus for allocating channels for a wireless communication local area network, the system comprises a console and a plurality of nodes that can be controlled by the console through wireless communication; and said apparatus comprises:

a connecting means for connecting at least two nodes in series, each of the nodes being configured to transmit signals in turn through said connecting means;

a triggering unit for sending a trigger signal to a first node through said connecting means;

a receiving unit for receiving a first response signal sent by the first node in response to said trigger signal so as to determine that the first node is available;

an allocating unit for allocating a first wireless channel for wireless communication between the console and the first node and sending information including the allocation of the first wireless channel to the first node; whereupon the first node transmits the trigger signal to a second node adjacent to the first node after confirming that the allocation of the first wireless channel has been completed.

According to another aspect, the present invention provides a central component for allocating channels for a wireless communication local area network system, the system comprises a console and a plurality of nodes that can be controlled by the console through wireless communication, each of the nodes is configured to transmit signal in turn through a connecting means; and said central component comprises:

a triggering unit for sending a trigger signal to a first node through said connecting means;

a receiving unit for receiving a first response signal sent by the first node in response to said trigger signal so as to determine that the first node is available;

an allocating unit for allocating a first wireless channel for wireless communication between the console and the first node and sending information including the allocation of the first wireless channel to the first node; whereupon the first node transmits the trigger signal to a second node adjacent to the first node after confirming that the allocation of the first wireless channel has been completed.

According to another aspect, the present invention provides a lighting network system which comprises a console and a plurality of nodes that can be controlled by the console through wireless communication, each of the nodes being configured to operate at least one controllable light-emitting element; wherein said system comprises:

a connecting means for connecting at least two nodes in series, each of the nodes being configured to transmit signals in turn through said connecting means;

a triggering unit for sending a trigger signal to a first node through said connecting means;

a receiving unit for receiving a first response signal sent by the first node in response to said trigger signal so as to confirm that the first node is available;

an allocating unit for allocating a first wireless channel for wireless communication between the console and the first node and sending information including the allocation of the first wireless channel to the first node; whereupon the first node transmits the trigger signal to a second node adjacent to the first node after confirming that the allocation of the first wireless channel has been completed.

The above technical solutions of the present invention facilitates the allocation of wireless channels in a wireless communication local area network in accordance with the physical addresses of the respective nodes, whereby the application of wireless communication techniques to various fields is made more convenient. The method of manually recording the physical locations of the nodes is very difficult and ineffective, especially if the number of nodes is very large, which is where the advantage of the present invention becomes particularly apparent. In some circumstances that require the respective nodes to be controlled for achieving some integral effect, for example where the illumination devices of the respective nodes are used in a remotely controlled lighting network system to display different patterns, the convenience resulting from the application of the present invention is significant.

The above and other aspects of the invention will be illustrated in more detail with reference to the embodiments described below.

DESCRIPTION OF THE DRAWINGS

Examples of the invention will be illustrated below with reference to the drawings, wherein FIG. 1 schematically depicts the structure of a wireless communication local area network according to the present invention.

In the above drawings, the same reference signs denote the same, similar or corresponding functional features.

MODE OF CARRYING OUT THE INVENTION

Figure 1:
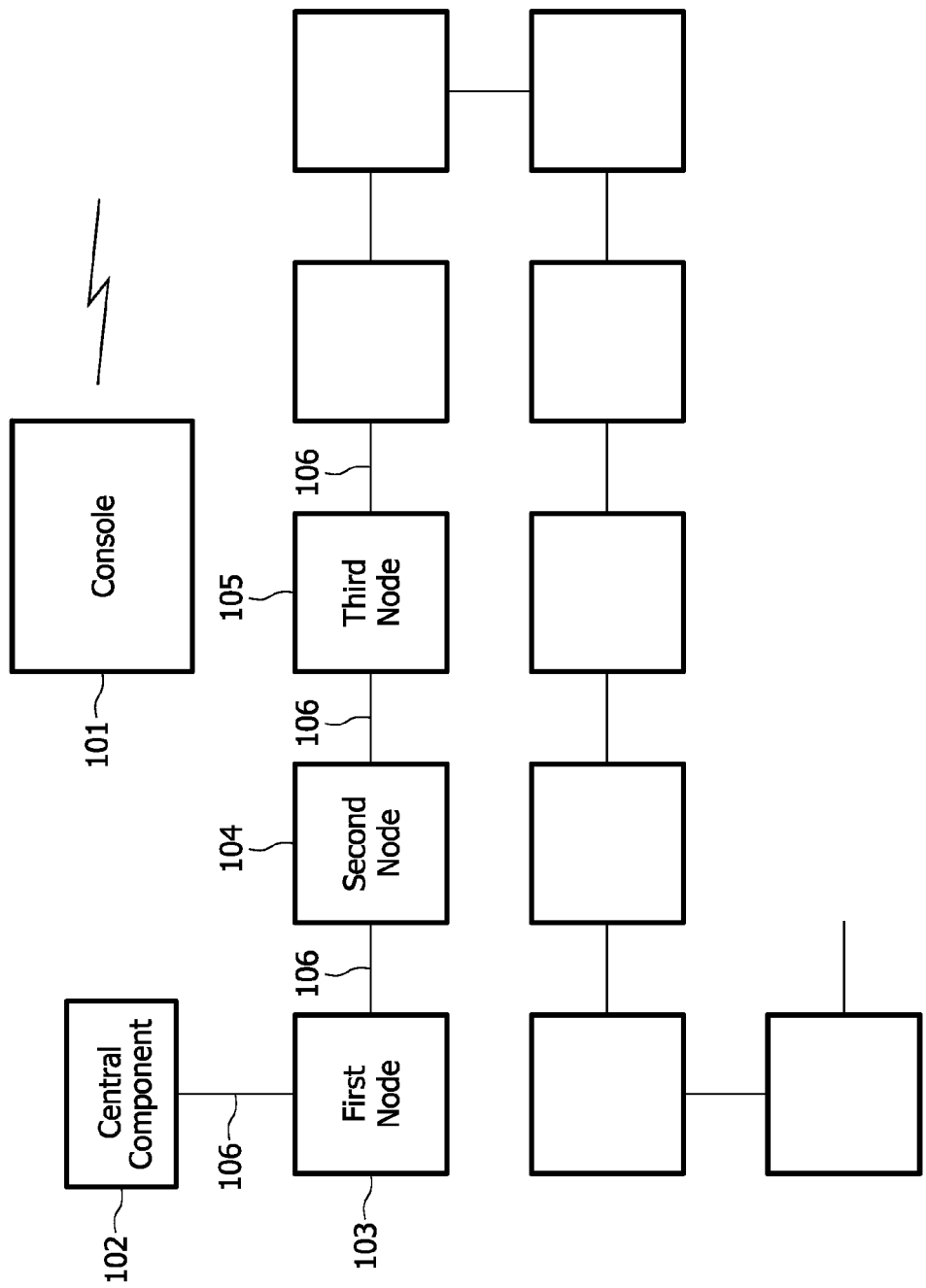

FIG. 1 is a schematic drawing of an example of a wireless communication local area network. The network comprises a console 101 and a plurality of nodes 103, 104, 105, etc. The console 101 exchanges information with the nodes and controls the nodes by communicating with them. Each of the nodes may operate one or a plurality of electronic devices, for example, each node may control one lamp or a group of lamps; the console may control the electronic devices by sending control signals to the nodes; while the console may acquire the status or various parameters of the electronic devices from the information transmitted by the nodes.

It is hard to obtain the accurate physical locations of the nodes through wireless communication only; while manually obtaining the physical locations of the respective nodes is obviously difficult. In this embodiment, the technical solution disclosed in the present invention is adopted to solve this problem. As FIG. 1 shows, the respective nodes are connected in series to a central component 102 via a connecting means 106. The one-to-one correspondence between the physical location of a node and a specific channel is conveniently established by means of the central component. The operating principle of the central component will be described in detail with reference to the embodiment shown in FIG. 2.

It is to be noted that FIG. 1 only depicts the operating scene and connection relationships of the invention in a general way. In fact, a node in the figure may include one or more sub-nodes; the central component in the figure may be a separate device or an operating module in the console; the sequential connections between the central component and the respective nodes through the connecting means 106 may be temporary or permanent; and after completing the channel allocation for the wireless local area network, the connecting means is not essential in the operation of the network. The connecting means is usually one or a group of wires, or it may be any means that can realize a serial connection between the central component and the nodes and can transmit signals; the central component may be connected to all nodes in the local area network or it may be connected to some of the nodes in the local area network, which comprises at least two nodes, so as to realize step by step or partially the allocation of channels to the network nodes.

Figure 2:
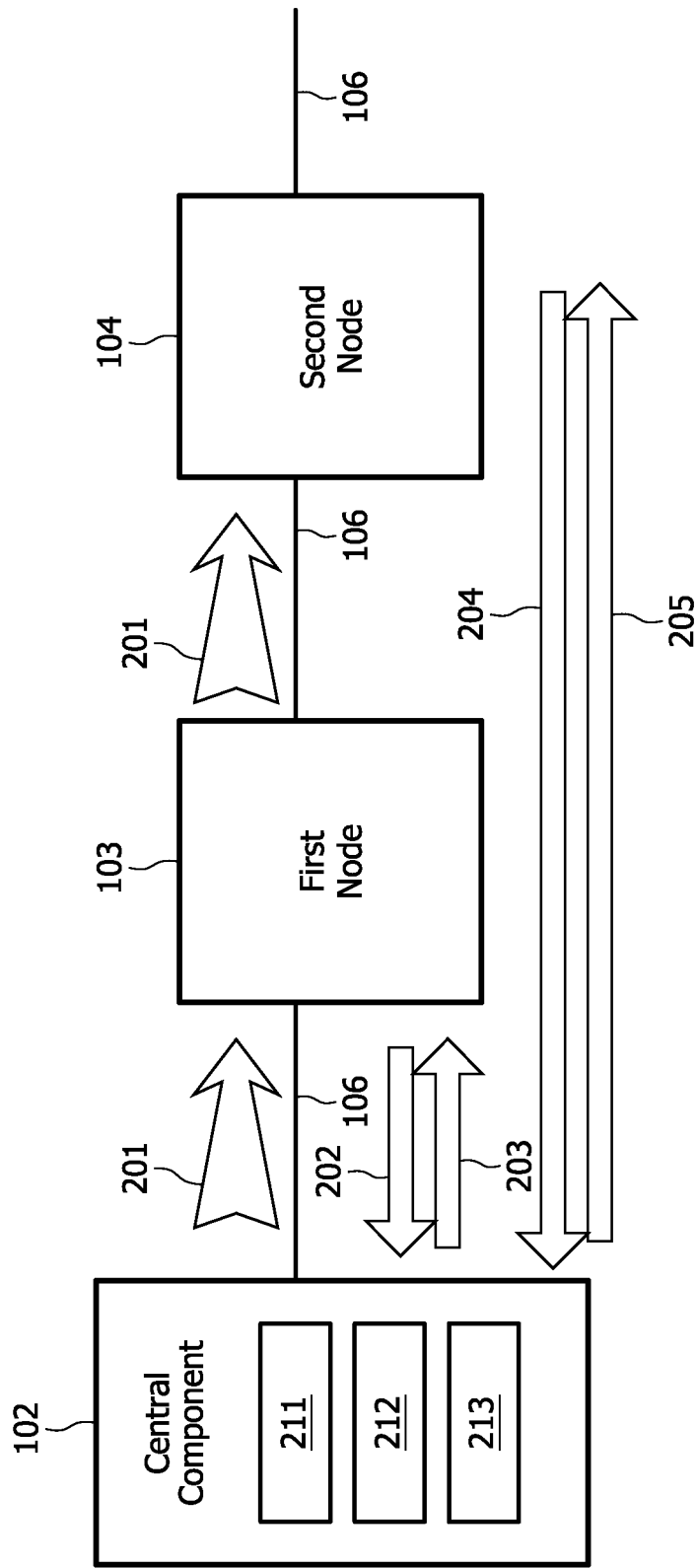
FIG. 2 schematically depicts the channel allocation process of a wireless communication local area network system according to the present invention.

As an example, FIG. 2 schematically depicts a method of allocating channels to the respective nodes in a wireless communication local area network according to the present invention. The method is mainly implemented by the central component 102 in a network environment that is the same as or similar to the one shown in FIG. 1. The implementation process of the invention is described herein with reference only to the central component 102, a first node 103, and a second node 104 by way of example. As described above, the central component 102, the first node 103, and the second node 104 are connected in series via a connecting means 106, and the central component 102 can transmit a trigger signal 201 to the adjacent first node 103 via said connecting means. Upon reception of the trigger signal, the first node sends a response signal 202 to said signal, which is received by the central component 102. After receiving this feedback or response signal 202, the central component 102 allocates a specific channel CH1 for subsequent wireless communication between the console and the first node 103 and sends a channel allocation signal 203 to inform the first node 103, whereby the channel allocation to the first node is completed. Since the nodes are connected in series, the first node 103 transmits the trigger signal 201 to the adjacent next node, i.e. the second node 104, immediately after confirming that the channel allocation has been completed. The channel allocation process for the second node 104 is the same as that for the first node 103, i.e. after receiving a response signal 204 sent by the second node 104 in response to the trigger signal, the central component 102 allocates a second wireless channel CH2 for wireless communication between the console and the second node 104 and informs the second node 104 of a channel allocation by sending signal 205, whereby the channel allocation to the second node 104 is completed. Channel allocation may subsequently be carried out for more nodes in the same manner. During the channel allocation processes described above, the communication between the central component 102 and the nodes is typically realized by a preset common channel. If the central component is an operating module in the console, the common channel is just the preset common channel between the console and the nodes as generally used in wireless communication networks. In this common channel, all nodes can send information to the console, and the information sent from the console can be received and identified by all nodes.

The above processes may also be described from a different point of view. The first node 103 first receives a trigger signal 201 from the central component through the connecting means and then sends a response signal 202 responding to the trigger signal so as to confirm that the first node 103 is available. The response signal 202 may include the necessary parameters relating to the first node 103. The central component 102 sends a channel allocation signal 203 after receiving the response signal 202. The first node receives said signal 203 and carries out a storage or other necessary setting in accordance with the channel allocation content included in said signal, whereupon the specific channel CH1 will be used to perform wireless communication with the console. The channel allocation for the first node has thus been completed. Afterwards, the first node transmits the trigger signal 201 to its adjacent next node, i.e. the second node 104, to perform the same channel allocation for the second node. Said method may again be used for channel allocation to more nodes.

In the above example, the channel allocation is mainly realized through the central component 102. It is to be noted, however, that the central component may actually include various operating units that realize the corresponding process, for example a triggering unit 211 for sending a trigger signal to a first node through the connecting means; a receiving unit 212 for receiving a first response signal sent by the first node for responding to the trigger signal so as to determine that the first node is available; an allocating unit 213 for allocating a first wireless channel that is used for wireless communication between the console and the first node and for sending information including allocation of the first wireless channel to the first node; wherein the first node transmits the trigger signal to a second node adjacent to the first node after confirming that the allocation of the first wireless channel has been completed. These operating units may achieve their respective functions, or one and the same operating unit may achieve a plurality of functions; or even the spatial integration of these operating units is not always necessary, because the same functions may also be achieved by spatially dispersed operating units, for example, there may not be a separate central component, but the above operating units may be integrated into the console or be dispersed in other appropriate locations in the network. In other words, the spatial independence and integrity of the central component is not necessary as long as it does not influence the functions described in the invention. Equivalent substitutes of similar functional units may be readily realized by existing techniques, so they will not be elaborated one by one hereinafter.

Figure 3:
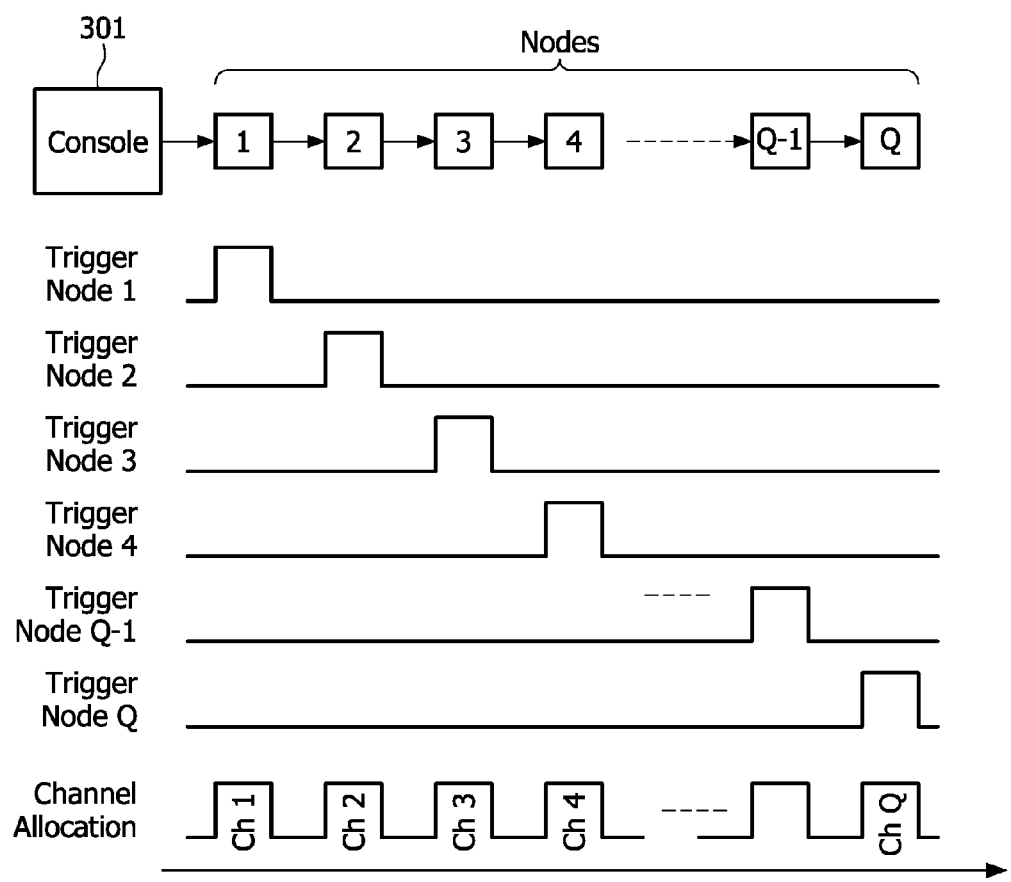
FIG. 3 schematically depicts the process of sending trigger signals to the respective nodes according to the present invention.

FIG. 3 is an example of sending trigger signals to the respective nodes and allocating channels to the respective nodes in accordance with the present invention. In this example, the functional units of the central component 102 as described above are integrated into the console. As shown in FIG. 3, the console 301 first sends a trigger signal to the first node and allocates a separate channel CH1 according to the present invention for communication between the console and the first node. In this channel allocation process, only the first node is triggered. Then the trigger signal is transmitted to the second node to trigger the second node, and the console allocates a separate channel CH2 according to the present invention for communication between the console and the second node. Only the second node is triggered during this channel allocation. The channel allocation for all of the Q nodes is conveniently realized one by one in the same manner.

Figure 4:
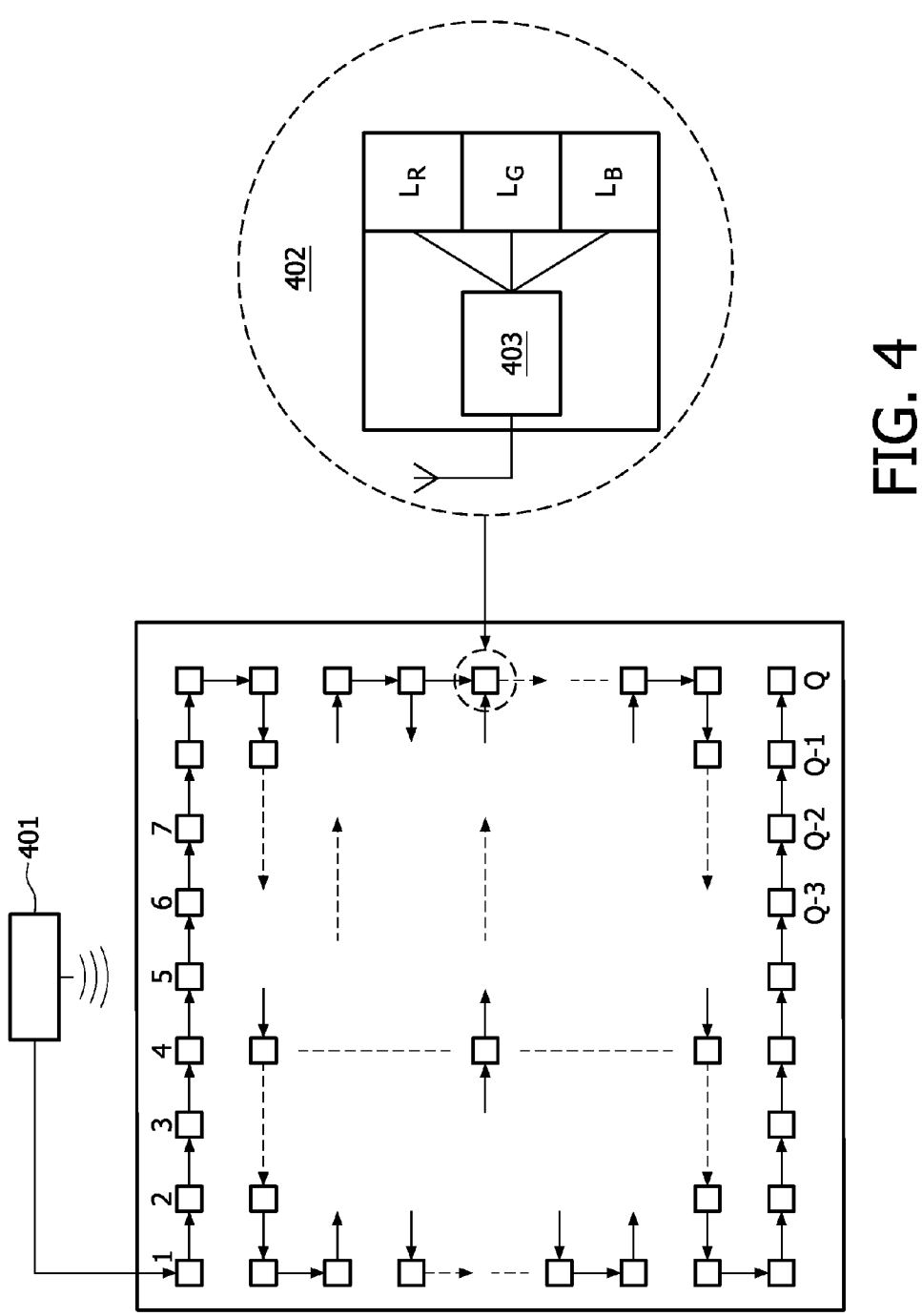
FIG. 4 schematically depicts a remotely controlled lighting network system according to the present invention.

FIG. 4 is a schematic drawing of a remotely controlled lighting network system according to the present invention. As shown in the figure, a console 401 controls a great number of nodes through wireless communication. In this example, each of the nodes, such as node 402, is provided with a wireless communication element 403 which can operate three different, i.e. red, green and blue, light-emitting units LR, LG and LB. An integral display effect scheme can be preset in the console. In order to realize this display effect scheme, the console needs to send different luminous effect instructions to nodes situated at respective individual locations so as to achieve the preset integral display effect. First the console and the respective nodes may be connected in series via a connecting means, such as a wire. The order of the connections can be preset or be readily acquired during debugging. Then the console sends a trigger signal, which is transmitted to consecutive nodes in turn according to the present invention, whereby a separate wireless communication channel can be allocated to each of the nodes. When all the nodes have been triggered and have completed the channel allocation, the correlation between the physical locations of the nodes and the specific wireless communication channels thereof is established, so that the console can conveniently realize various preset integral display effect schemes by remotely controlling the nodes at different locations.

FIG. 4 merely shows an example. The number and the display parameters of light-emitting elements controlled by the respective nodes may be set in different ways, as desired.

The present invention may be applied not only to the remotely controlled lighting network system shown in FIG. 4, but to other remotely controlled local area networks as well, which may be connected to different electronic devices controlled by the respective nodes, such as a remotely controlled inductor network consisting of a plurality of inductors.

The invention was depicted and illustrated in detail in the drawings and the above description, but it is evident that these are descriptive and demonstrative, but they are not restrictive. The invention is not limited to the disclosed embodiments.

Those in the art will understand how to vary the disclosed embodiments from studying the drawings, the disclosed contents, and the appended claims. The word "comprising" used in the claims does not exclude the presence of elements or steps other than those listed in a claim. The word "a" or "an" preceding an element does not exclude the presence of a plurality of such elements. One functional unit may achieve the functions of a plurality of functional units as cited in the claims. Any reference sign used in the claims shall not be construed as limiting the scope of the claims.

The invention claimed is:

1. A method of allocating wireless channels for a wireless communication local area network, with a system comprising a console and a plurality of nodes controlled by the console through wireless communication said method comprising:
   connecting a first node in series with said console and a second node via connecting means;
   sending by said console a trigger signal to the first node through said connecting means;
   receiving by said console a first response signal sent by the first node in response to said trigger signal to determine that the first node is available;
   allocating by said console a first wireless channel for wireless communication between the console and the first node; and
   sending information by said console including the allocation of the first wireless channel to the first node;
   sending by said first node the trigger signal to the second node through said connecting means after confirming that allocation of the first wireless channel has been completed, wherein said first wireless channel is allocated to the first node, and a second wireless channel, separate from the first wireless channel, is allocated to the second node in order of series connection to said console, the second wireless channel being allocated for wireless communication between the console and the second node; and
   after allocating the first wireless channel for the wireless communication between the console and the first node and allocating the second wireless channel for the wireless communication between the console and the second node:
      communicating wirelessly between the console and the first node; and
      communicating wirelessly between the console and the second node.

2. The method of claim 1, further comprising:
   connecting the first and second nodes in series to a central component, which is a functional module of the console, such that the central component sends said trigger signal to the first node, said central component being configured to perform wireless communication with respective nodes through a common channel.

3. The method of claim 1, further comprising:
   receiving a second response signal sent by the second node in response to the trigger signal, which second response signal is used for allocating the second wireless channel to the second node for wireless communication between the console and the second node.

4. The method of claim 3, further comprising:
   allocating the second wireless channel for wireless communication between the console and the second node, and sending information including the allocation of the second wireless channel to the second node; whereupon the second node transmits the trigger signal to a third node adjacent to the second node via the connecting means after confirming that the allocation of the second wireless channel has been completed.

5. The method of claim 1, wherein at least one of the nodes is configured to operate at least one electronic device.

6. The method of claim 5, wherein the electronic device is a controllable light-emitting element.

7. The method of claim 1, further comprising disconnecting the connecting means between the console and the first node and the second node after allocating the first wireless channel for the wireless communication between the console and the first node and allocating the second wireless channel for the wireless communication between the console and the second node, and before communicating wirelessly between the console and the first node and communicating wirelessly between the console and the second node.

8. The method of claim 1, wherein communicating wirelessly between the console and the first node including transmitting first luminous effect instructions from the console to the first node without wires, and wherein communicating wirelessly between the console and the second node including transmitting second luminous effect instructions from the console to the second node without wires.

9. An apparatus, comprising:
   a console for sequentially allocating channels for a wireless communication local area network which includes the console and at least a first node and a second node controlable by the console through wireless communication; and
   connecting means for connecting the first node in series with the console and the second node, each of the first and second nodes being configured to transmit signals in turn through said connecting means,
wherein the console includes:
a triggering unit configured to sequentially send a trigger signal to the first node and the second node through said connecting means;
a receiving unit configured to receive a first response signal sent by the first node in response to said trigger signal to determine that the first node is available, and a second response signal sent by the second node in response to said trigger signal to determine that the second node is available;
an allocating unit configured to allocate in order of series connection a first wireless channel for wireless communication between the console and the first node and a separate second wireless channel for wireless communication between the console and the second node, and to send information including the allocation of the first wireless channel to the first node and the allocation of the second wireless channel to the second node; and
a wireless communication element configured for communicating wirelessly with the first node via the first wireless channel and for communicating wirelessly with the second node via the second wireless channel.

10. The apparatus of claim 9, wherein the console is configured to transmit first luminous effect instructions to the first node without use of a wired connection, and to transmit second luminous effect instructions to the second node without use of a wired connection, after allocating the first wireless channel for wireless communication between the console and the first node and the separate second wireless channel for wireless communication between the console and the second node.

11. The apparatus of claim 9,
wherein the connecting means is for connecting the first node in series with the console and the second node and a third node, each of the first, second and third nodes being configured to transmit signals in turn through the connecting means;
wherein the triggering unit is configured to sequentially send a trigger signal to the first node, the second node and the third node through the connecting means;
wherein the receiving unit is configured to receive a third response signal sent by the third node in response to the trigger signal to determine that the third node is available;
wherein the allocating unit is configured to allocate in order of series connection the first wireless channel for wireless communication between the console and the first node, the separate second wireless channel for wireless communication between the console and the second node, and another separate third wireless channel for wireless communication between the console and the third node, and to send information including the allocation of the third wireless channel to the third node; and
wherein the wireless communication element is configured for communicating wirelessly with the third node via the third wireless channel.

12. A lighting system, comprising:
a console;
a first node configured to operate at least one first controllable light-emitting element;
a second node configured to operate at least one second controllable light-emitting element; and
connecting means for connecting the console in series with at least the first node and the second node, each of the first and second nodes being configured to transmit signals in turn through the connecting means,
wherein the console comprises:
a triggering unit configured to sequentially send a trigger signal to the first node and the second node through the connecting means,
a receiving unit configured to receive a first response signal sent by the first node in response to the trigger signal to determine that the first node is available, and a second response signal sent by the second node in response to the trigger signal to determine that the second node is available, and
an allocating unit configured to allocate in order of series connection a first wireless channel for wireless communication between the console and the first node and a separate second wireless channel for wireless communication between the console and the second node, and to send information including the allocation of the first wireless channel to the first node and the allocation of the second wireless channel to the second node,
wherein the first node includes a first wireless communication element configured for communicating wirelessly with the console via the first wireless channel, and
wherein the second node includes a second wireless communication element configured for communicating wirelessly with the console via the second wireless channel.

13. The lighting system of claim 12, wherein the console is configured to transmit first luminous effect instructions without use of a wired connection to the first node for operating the at least one first controllable light-emitting element, and to transmit second luminous effect instructions to the second node without use of a wired connection to the second node for operating the at least one second controllable light-emitting element, after allocating the first wireless channel for wireless communication between the console and the first node and the separate second wireless channel for wireless communication between the console and the second node.

14. The lighting system of claim 12, further comprising a third node configured to operate at least one third controllable light-emitting element,
wherein the connecting means is for connecting the first node in series with the console and the second node and the third node, each of the first, second and third nodes being configured to transmit signals in turn through the connecting means;
wherein the triggering unit is configured to sequentially send a trigger signal to the first node, the second node and the third node through the connecting means;
wherein the receiving unit is configured to receive a third response signal sent by the third node in response to the trigger signal to determine that the third node is available;
wherein the allocating unit is configured to allocate in order of series connection the first wireless channel for wireless communication between the console and the first node, the separate second wireless channel for wireless communication between the console and the second node, and another separate third wireless channel for wireless communication between the console and the third node, and to send information including the allocation of the third wireless channel to the third node; and wherein the third node includes a third wireless communication element configured for communicating wirelessly with the console via the third wireless channel.

* * * * *